Patented Dec. 29, 1925.

1,567,378

UNITED STATES PATENT OFFICE.

WILLIAM SOMERVILLE MILLAR, OF LONDON, ENGLAND.

DESULPHURIZATION AND CONCENTRATION OF SULPHIDE IRON ORES.

No Drawing.   Application filed March 10, 1925.  Serial No. 14,583.

*To all whom it may concern:*

Be it known that I, WILLIAM SOMERVILLE MILLAR, a subject of the King of Great Britain and Northern Ireland, residing at London, England, have invented new and useful Improvements in the Desulphurization and Concentration of Sulphide Iron Ores, of which the following is a specification.

This invention relates to a process of desulphurizing and concentrating sulphide iron ores.

In accordance with the invention the ore, which may be any sulphide ore of iron, such as iron pyrites or pyrrhotite, with or without a silicious or other gangue, and of a size preferably not exceeding 1/4" cube, is subjected to the action of a mixture of sulphur dioxide gas and steam in variable proportions in a muffle or other furnace, such as a mechanical furnace, the lower floors of which are maintained at a temperature not exceeding 950° C.

The sulphur dioxide gas used may be supplied either as pure dry sulphur dioxide or as a mixture of sulphur dioxide with an inert gas such as nitrogen, prepared by burning sulphur or pyrites in air in burners of the usual construction in such manner that the oxygen content of the resulting gas does not exceed 1%.

In the treatment of iron pyrites by the process of the invention the ascending hot gases volatilize the more mobile part of the sulphur content, leaving a material of the approximate composition FeS, which, on the lower hotter floors of the furnace, or in a separate furnace or receptacle, reacts with the sulphur dioxide according to the equation:—

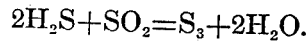

The desulphurization taking place according to this equation is accelerated by the regulated admission of a small amount of steam into the gas or gas mixture. The course of the main reaction is dependent on the amount of steam present. With the steam there is momentarily formed sulphuretted hydrogen which combines with the sulphur dioxide, thus:—

$$2H_2S + SO_2 = S_3 + 2H_2O.$$

The products of the reaction are a highly magnetic oxide of iron and an exit gas highly charged with the vapour of elementary sulphur containing perhaps also volatile impurities, such as arsenic compounds.

The exit gas is led into condensing chambers where the sulphur and other condensible products are precipitated. The residual gas from the chambers may be returned to the furnace. The magnetic oxide may be concentrated by the usual processes of electromagnetic separation and the concentrate may be briquetted.

What I claim is:—

A process of desulphurizing and concentrating sulphide iron ores which comprises subjecting the ore reduced to a suitable size to the action of sulphur di-oxide gas in a muffle or other furnace, said gas containing at least 50% $SO_2$ and the ore being continuously agitated and progressively heated to a temperature not exceeding 950°, in such manner that no surface fusion of the ore occurs.

In testimony whereof I have signed my name to this specification.

W. S. MILLAR.